United States Patent Office 2,975,166
Patented Mar. 14, 1961

2,975,166

SODIUM-CATALYZED ETHYLENE POLYMERIZATION

Uno Kruse, East Orange, and Daniel F. Herman, Orange, N.J., assignors to National Lead Company, New York, N.Y., a corporation of New Jersey No Drawing. Filed Apr. 28, 1959, Ser. No. 809,343

6 Claims. (Cl. 260—94.9)

The invention relates to a process for polymerization of ethylene. More particularly, this invention relates to a process for the polymerization of ethylene utilizing zirconium tetrachloride, a Grignard reagent, and sodium metal.

Zirconium tetrachloride and a Grignard such as methylmagnesium bromide and the like, have been previously known and used in the polymerization of ethylene; however, the use of zirconium tetrachloride and a Grignard as catalysts for the polymerization of ethylene has been severely limited. This limitation was due to the fact that the behavior of zirconium tetrachloride with a Grignard was unpredictable and would result in yields ranging from traces of polyethylene per mole of zirconium to 10 pounds of polyethylene per mole of zirconium at atmospheric pressure. This unpredictable behavior and the poor yields obtained were in part due to the extreme sensitivity of $ZrCl_4$ to moisture and air, especially at the lower valence levels of the zirconium. These lower valence levels are formed when the Grignard reagent reacts with the zirconium tetrachloride thereby forming an organozirconium compound and reducing the zirconium to a lower valence level. The unpredictable behavior and poor yields were also due in part to the presence of trace impurities such as oxychlorides, HCl, and the like, with the $ZrCl_4$. These trace impurities were extremely difficult to remove. The unpredictable behavior and poor yields obtained were also due in large part to the fact that $ZrCl_4$ and a Grignard reagent were a deficient catalyst system by themselves, for the polymerization of ethylene at atmospheric pressure. This unpredictable behavior and the poor yields obtained severely restricted the use of the zirconium tetrachloride and Grignard catalysts for the polymerization of ethylene.

An object of this invention therefore, is to provide a process for the polymerization of ethylene which will result in high yields. Yet another object is to provide a process for the polymerization of ethylene which will result in high yields at atmoshperic pressure. Another object of this invention is to provide a process for the polymerization of ethylene using a zirconium tetrachloride and Grignard catalyst which is predictable in its behavior and consistently results in high yields. Other objects and advantages will become apparent from the following more complete description and claims.

Broadly, this invention contemplates a process for the polymerization of ethylene comprising the steps of treating ethylene with zirconium tetrachloride, a Grignard reagent and sodium.

In a particularly desirable embodiment, this invention contemplates a process as aforesaid wherein one mole of zirconium tetrachloride is present for each 1¾ to 3½ moles of the Grignard present, and for ½ to 16 moles of sodium present.

In the case of the Grignard present, it is preferred that about 2¼ moles of the Grignard be present for each mole of zirconium tetrachloride present because this ratio has been found to result in the optimum polymerization rate.

At a ratio of two moles of Grignard reagent to 1 mole of $ZrCl_4$, the rate of polymerization, measured as the rate of ethylene absorption, was 50% lower than when a 2¼:1 ratio of Grignard to $ZrCl_4$ was used. At ratios of 2½ to 1 and 3 to 1 of Grignard reagent to $ZrCl_4$, the rate of ethylene absorption was respectively 10% and 30% lower than the 2¼ to 1 ratio of Grignard reagent to $ZrCl_4$. Further deviations from the preferred ratio of 2¼ to 1 gave even poorer results. The above examples were run without sodium, and all of the Grignard reagent was added to the $ZrCl_4$ in one operation.

If less than 1¾ moles of the Grignard to 1 mole of $ZrCl_4$ are present, the process of the polymerization will yield only trace amounts of polyethylene. If more than 3½ moles of the Grignard are used for each mole of zirconium tetrachloride, once again the process of polymerization of ethylene will yield only trace amounts of polyethylene.

It is thought that ratios of from 1¾ to 3½ moles of Grignard per mole of $ZrCl_4$, favors the formation of catalytically active organozirconium compounds of lower valence level than the +4 valence level of $ZrCl_4$. These organozirconium compounds are most stable and active when formed using a ratio of 2¼ moles of Grignard reagent per mole of $ZrCl_4$.

The activity of the catalyst and the resultant polymer are also affected by the order of addition of the components. Saturation of the $ZrCl_4$ with ethylene prior to the addition of the Grignard, favors the formation of a fine powder-like polymer which is much easier to purify than the lumpy polyethylene usually obtained when the ethylene is introduced into the reaction mixture at a later stage.

The reactivity of the catalyst is considerably increased when the Grignard reagent is added to the reaction mixture in two separate additions rather than one addition. For example, in two otherwise identical runs, by using the split addition method for the addition of the Grignard reagent, we obtained a yield of 13 pounds of polyethylene per mole of $ZrCl_4$. On the other hand, where the Grignard reagent was introduced into the reaction mixture in one addition only, the yield of polyethylene was only 8 pounds of polyethylene per mole of $ZrC_4$.

The role of sodium in the process of this invention is not fully established; however when sodium is also present, the yield of polyethylene is more than doubled. For example, in two otherwise identical runs, the yield was increased from 13 pounds of polyethylene per mole of $ZrCl_4$ to 26 pounds of polyethylene per mole of $ZrCl_4$ through the use of sodium in the polymerization process. This increased yield may be due in part to the scavenging action of sodium on catalyst poisons such as traces of water and HCl, and it may be due in part to interchange reactions between sodium and polymerzirconium catalyst molecules whereby the zirconium catalyst would be freed for further reaction with ethylene. The above discussion is not to be considered as binding and in no way is it to be construed as limiting except as set forth in the claims.

The sodium is most effective when added after the polymerization rate has reached its maximum value. The action of the sodium inhibits the usual rapid decrease in ethylene absorption and thus considerably prolongs the life of the catalyst. When the sodium is added while the reaction rate is still increasing, i.e. immediately after the addition of the Grignard reagent, then the maximum rate of polymerization is not obtained.

The ratio of sodium present may vary from ½ mole to 16 moles of sodium for each mole of zirconium tetrachloride present.

Below the ratio of ½ mole of sodium, the effect of the sodium on the increasing of the yield of polyethylene is not great enough to be of any economic value.

Above the ratio of 16 moles of sodium, the amount of increased yield of polyethylene obtained by using a ratio of sodium in excess of 16 moles as compared to the increased yield obtained by using up to 16 moles of sodium, is not great enough to economically warrant the use of sodium in excess of 16 moles per mole of zirconium tetrachloride.

It is preferred however, to use a ratio of from 4 to 8 moles of sodium as excellent results are thus obtained. While more than a ratio of 8 moles of sodium may be used, it has been found, from the point of view of economic considerations, that a ratio of from 4 to 8 moles of sodium produces a yield of polyethylene which is economically more feasible when the yield is compared to the amount of sodium used.

The sodium is employed in the reaction mixture as a finely divided dispersion in order to insure intimate contact of the sodium with the catalyst and/or impurities. Any particle size of the sodium up to 50 microns may be used.

The Grignard which may be used may be any Grignard, but generally speaking, optimum results have been obtained using a Grignard containing up to about five carbon atoms if aliphatic, and a phenyl group if aromatic. Included among such Grignards are methylmagnesium bromide, methylmagnesium chloride, ethylmagnesium bromide, ethylmagnesium iodide, propylmagnesium bromide, propylmagnesium chloride, butylmagnesium iodide, butylmagnesium bromide, amylmagnesium chloride, amylmagnesium bromide, phenylmagnesium bromide, and the like.

In general, the polymerization will be carried out at slightly elevated temperatures, but any temperature within the range of from $-20°$ C. to about $150°$ C., and preferably from about $30°$ C. to about $70°$ C. may be used. In the same way, while the use of atmoshperic pressure is sufficient to produce high yields, the polymerization may be carried out under a wide range of pressure, as for example, from a partial vacuum to about 2,000 pounds but preferably at about atmospheric pressure. Higher pressures may, of course be used but generally do not appreciably alter the course of the process.

The reaction medium may be any inert liquid such as benzene, heptane, toluene, xylene, and the like. The choice of a suitable inert reaction medium does not critically affect the catalyst activity, and may be left to economic or other considerations.

In order to more fully illustrate the nature of this invention and the manner of practising the same, the following examples are presented.

*Example I*

In 2,400 ml. of dry toluene, 20 millimoles of $ZrCl_4$ was dispersed. This addition was accomplished while sparging the system with nitrogen. Ethylene was then introduced and the mixture was saturated with ethylene. Ten minutes later, the Grignard was added in the form of methylmagnesium bromide in ether. The addition of the 30 millimoles of the Grignard was accomplished when the temperature of the mixture was at $20°$ C. The mixture was then heated to $40°$ C. over a 20 minute period. At $40°$ C., 15 additional millimoles of methylmagnesium bromide was added and polymerization commenced at a high rate. After the polymerization had been taking place for 10 minutes, 40 millimoles of finely divided sodium was added. The reaction temperature at the time of the addition was $50°$ C. The reaction was continued at $50°$ C. for five hours at which time the reaction rate had dropped to a low rate of polymerization as indicated by the low rate of absorption of the ethylene, and the reaction was terminated. The reaction was filtered, and the product was washed with methanol. The yield was 146 grams of high molecular weight highly crystalline polyethylene.

As a control, the above example was repeated, except that no sodium was used at any time during the polymerization process. The yield in this control was 104 grams of polyethylene.

*Example II*

The procedure of Example I was repeated, except that 80 millimoles of finely divided sodium was used in place of the 40 millimoles of sodium used in Example I. The yield was 176 grams of polyethylene. The molecular weight of the polyethylene was again high, and the polymer was again highly crystalline.

*Example III*

The procedure of Example I was repeated except that 3,000 ml. of toluene was used, and 160 millimoles of sodium was used in this Example III. A high yield (228 grams) of high molecular weight polyethylene was obtained in the manner of Example I.

*Example IV*

The procedure of Example I was repeated except that 320 millimoles of sodium was used in this Example IV, and 3,000 ml. of toluene was used. A high yield (235 grams) of high molecular weight polyethylene was obtained in the manner of Example I.

*Example V*

The procedure of Example I was repeated several times. Each time a different Grignard reagent was used on a molar ratio equal to the molar ratio of Example I. Among the Grignards used were, methylmagnesium chloride, ethylmagnesium iodide, propylmagnesium bromide, butylmagnesium iodide, amylmagnesium bromide, and phenylmagnesium chloride. Each time a high yield of high molecular weight polyethylene was obtained in the manner of Example I.

*Example VI*

The procedure of Example I was repeated twice. The first time, 35 millimoles of methylmagnesium bromide was used in place of the 45 millimoles of the Grignard used in Example I. The second time, 70 millimoles of methylmagnesium bromide was used. Both times, a high yield of high molecular weight polyethylene was obtained in the manner of Example I.

*Example VII*

The procedure of Example I was repeated except that 10 millimoles of sodium were used in this Example VII in place of the 40 millimoles of sodium used in Example I. A high yield of high molecular weight polyethylene was obtained in the manner of Example I. The polyethylene was highly crystalline.

As is obvious from the foregoing description and examples, the process of this invention results in almost double the yield of polyethylene previously obtained with zirconium tetrachloride and a Grignard only. The incorporation of sodium as a part of this process now makes it possible to use zirconium tetrachloride and a Grignard reagent in complete assurance that the results will be consistently predictable and the yield of polyethylene consistently higher than the unpredictable low yields of polyethylene obtained with zirconium tetrachloride and a Grignard alone wherein no sodium is present.

In addition, the polyethylene obtained has a high degree of crystallinity, that is a degree of crystallinity above 90%.

The process of this invention may also be used to produce carbon encapsulated with polyethylene. The process of encapsulation of carbon with polyethylene has been described and claimed in application Serial Number 736,686, filed May 21, 1958, Daniel F. Herman and Joseph A. Orsino, and assigned to the assignee hereof.

Similarly, the process of this invention may also be used to produce metals encapsulated with polyethylene. The process of encapsulation of metals with polyethylene has been described and claimed in application Serial Number 747,371, filed July 9, 1958, J. A. Orsino, D. F. Herman, and J. J. Brancato, and assigned to the assignee hereof.

In addition to these aforementioned uses for the process of this invention, the polyethylene produced according to the process of this invention may be used for all the conventional uses that polyethylene is used for. A description of these uses need not be entered into here, as they are well known in the art.

While this invention has been described in terms of certain preferred embodiments and illustrated by means of specific examples, these are illustrative only, and the invention is not be construed as limited, except as set forth in the following claims.

We claim:

1. A process for the polymerization of ethylene which comprises the steps of (1) treating ethylene with a catalyst system consisting essentially of $ZrCl_4$ and Grignard reagent thereby polymerizing said ethylene, (2) adding sodium to the polymerization reaction and, (3) polymerizing additional ethylene; said Grignard reagent being present in the ratio of from 1¾ to 3½ moles of the Grignard reagent for each mole of $ZrCl_4$, said sodium being present in the ratio of at least ½ mole of sodium for each mole of $ZrCl_4$.

2. A process according to claim 1, wherein said Grignard is methylmagnesium bromide.

3. A process according to claim 1, wherein said Grignard is ethylmagnesium bromide.

4. A process according to claim 1, wherein said Grignard is butylmagnesium bromide.

5. A process according to claim 1, wherein said Grignard is amylmagnesium bromide.

6. A process according to claim 1, wherein said Grignard is phenylmagnesium bromide.

References Cited in the file of this patent

UNITED STATES PATENTS

| | | |
|---|---|---|
| 2,904,542 | Fasce et al. | Sept. 15, 1959 |
| 2,905,645 | Anderson et al. | Sept. 22, 1959 |